United States Patent [19]

Gaspard

[11] 4,350,294
[45] Sep. 21, 1982

[54] SPRAY CULTIVATOR FOR SPRAYING WEEDS UNDER CROPS OF VARYING HEIGHTS GROWING ON LEVEL AND NON-LEVEL FIELDS

[76] Inventor: Martin Gaspard, Rte. 1, Batchelor, La. 70715

[21] Appl. No.: 196,729

[22] Filed: Oct. 14, 1980

[51] Int. Cl.$^3$ .............................................. B05B 1/20
[52] U.S. Cl. .................................................... 239/169
[58] Field of Search ............... 239/155, 166, 169, 176, 239/164; 111/6, 7, 69

[56] References Cited

U.S. PATENT DOCUMENTS

| | | | |
|---|---|---|---|
| 2,597,727 | 5/1952 | Hanson | 239/164 |
| 2,663,973 | 12/1953 | White | 239/176 X |
| 3,202,359 | 8/1965 | Gill | 239/176 X |
| 3,515,349 | 6/1970 | Mecklin et al. | 239/169 |
| 3,625,428 | 12/1971 | Mecklin | 239/166 |
| 3,874,593 | 4/1975 | Wilt | 239/166 |

*Primary Examiner*—John J. Love
*Assistant Examiner*—Gene A. Church
*Attorney, Agent, or Firm*—James B. Lake, Jr.

[57] ABSTRACT

A spray cultivator having a frame with unequal rigid side elements pivotally connects to define between pivots a parallelogram with opposite sides equal and parallel. The frame is fixed by a first side element to a lift bar of a prime mover for pulling the cultivator over level and non-level fields. The remaining three side elements comprise the remaining parallelogram sides and the free ends thereof extending downwardly and rearwardly beyond the pivotal connections of the parallelogram. A second side free end engages level and non-level field surfaces with a sliding shoe. A third side free end that is parallel to the fixed first side element supports a spray pipe and nozzle that is continuously perpendicular to a field's level and non-level surfaces at a constant height thereabove responsive to the field surface engagement and pivotal parallelogram connections of the frame side elements. A fourth side free end mounts a stop that engages the parallel second side free end for limiting excessive pivoting of the frame as the cultivator crosses abruptly uneven surfaces. Spray pipe and nozzle height, but not attitude is changeable by the lift bar. A chain stop is adjustable between fixed and pivotal adjacent side elements to limit excessive pivoting when lift bar is raised. A slotted pivotal connection in the fixed parallelogram side provides frame flattening for transportation but not in operation.

5 Claims, 4 Drawing Figures

SPRAY CULTIVATOR FOR SPRAYING WEEDS UNDER CROPS OF VARYING HEIGHTS GROWING ON LEVEL AND NON-LEVEL FIELDS

BACKGROUND OF THE INVENTION

The invention relates generally to spray cultivators for use with prime movers having lift bars, and more generally to spray cultivators for spraying the tops of weeds growing under crops of different heights on level and non-level fields.

In spray cultivating crops, it is necessary to spray herbicides below the foliage of the crops and on the tops of weeds growing thereunder. When a crop is of uniform height and the field uniformly flat, the prior art discloses a number of satisfactory spray cultivators; to wit, U.S. patents to Mecklin et al—3,515,349 and 3,625,428 and to Wilt—3,874,593. These patents disclose cultivators with rigid frames for supporting spray pipes and nozzles at a preset height and attitude that must be reset for every change in filed field crop level.

The spray cultivator of the invention teaches a pivotally connected parallelogram frame that automatically maintains the set height and attitude of the spray nozzles above a rolling field surface. Changes in the level of crops are quickly and easily compensated for by changing the height of the prime mover lift bar.

SUMMARY OF THE INVENTION

An object of the invention is to provide a spray cultivator with non-rigid frame for engaging field surfaces and supporting spray pipes and nozzles responsive to said field surface engagement to remain a constant height and attitude thereabove.

Another object of the invention is to provide stops for limiting said ground engaging response of said frame to operational parameters of the field surfaces and the growing crops.

Another object of the invention is to provide an non-upsettable sliding shoe for mounting on said ground engaging. non-rigid frame part.

Another object of the invention is to provide means for limiting the effects of said stops for transportation and not in operation.

DETAILED DESCRIPTION OF THE PREFERRED EMBODIMENT

Figure 1:
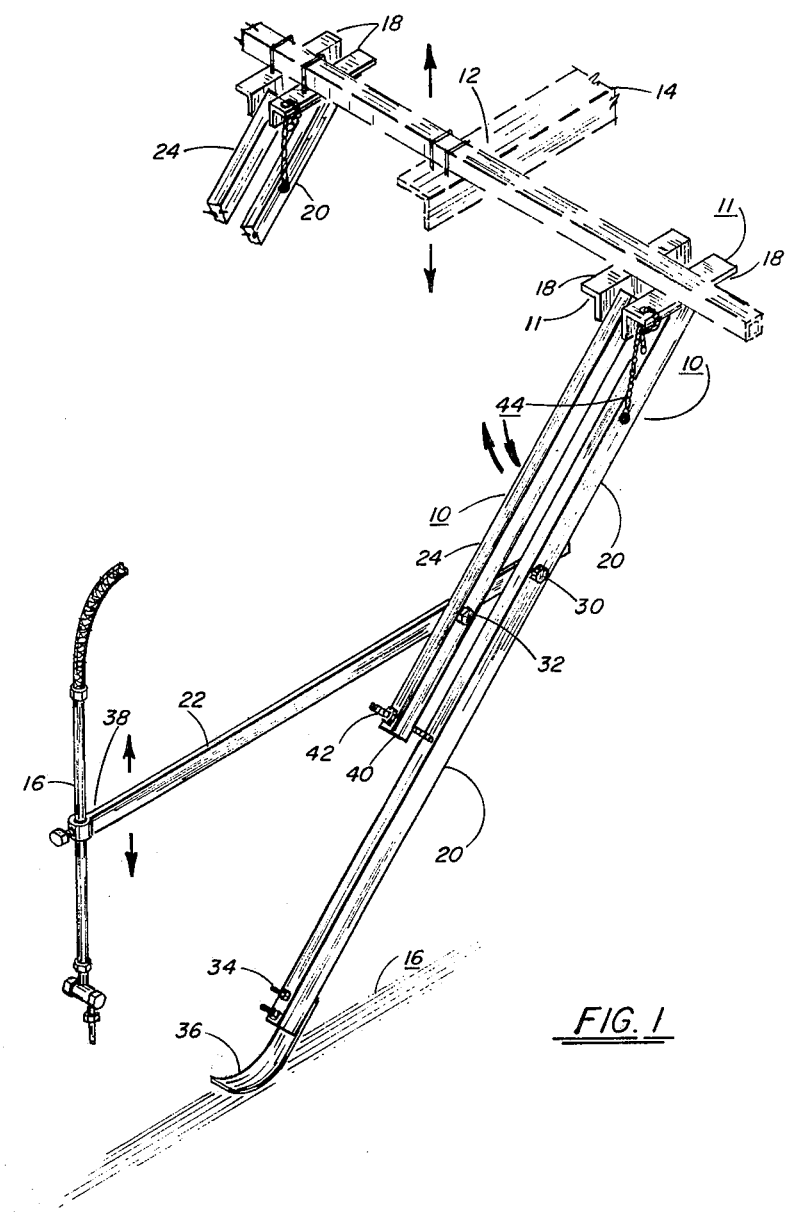
FIG. 1 is a three dimensional drawing of the cultivator attached to the lift bar of a prime mover (partially show) in operable position.
Figure 2:
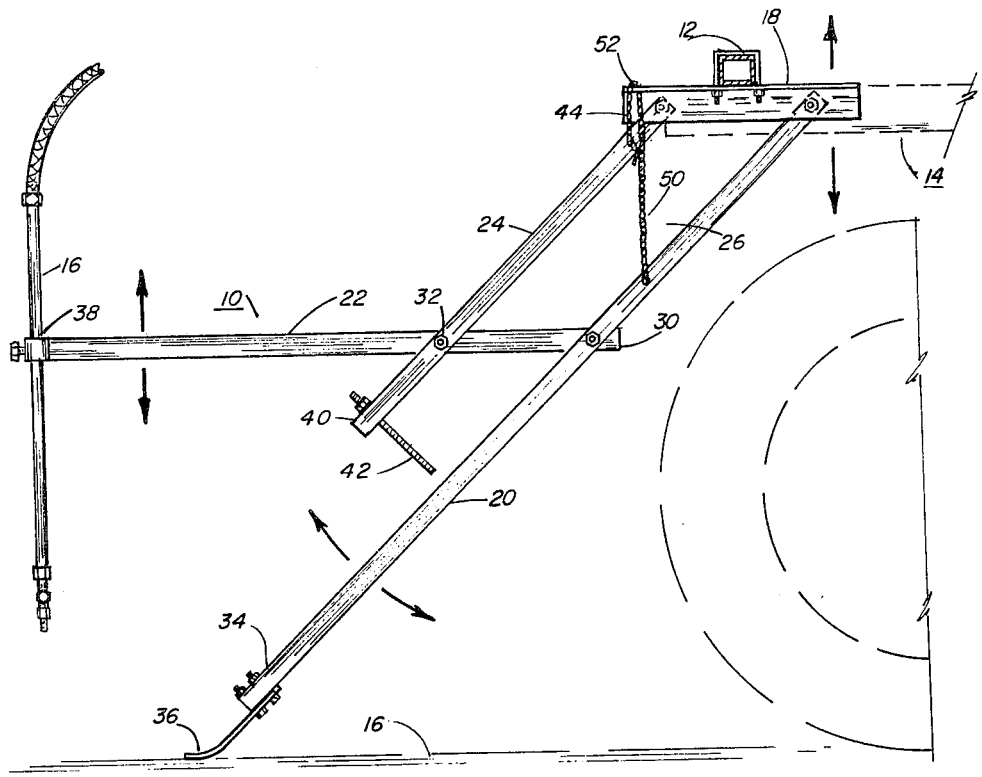
FIG. 2 is a side elevation of the matter of FIG. 1.

Referring to FIGS. 1-2, the invention comprises a frame 10 for attaching to a lift bar 12 of a prime mover 14. Spray pipe and nozzle 16 and adjustably mounted in height and attitude on frame 10. A container of herbicide (not shown) can be mounted on prime mover 14 (partially show) for connection with spray pipe and nozzle 16 to spray on weeds growing under crops as the invention is pulled down the crops rows by the prime mover.

Figure 3:
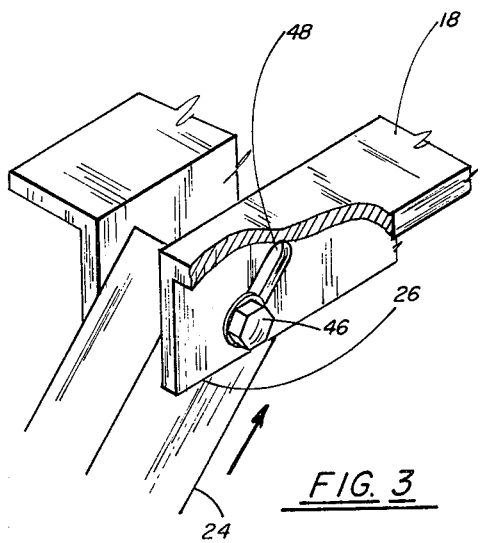
FIG. 3 is an enlarged three dimensional view of a pivot and slot connection shown in FIG. 2.
Figure 4:
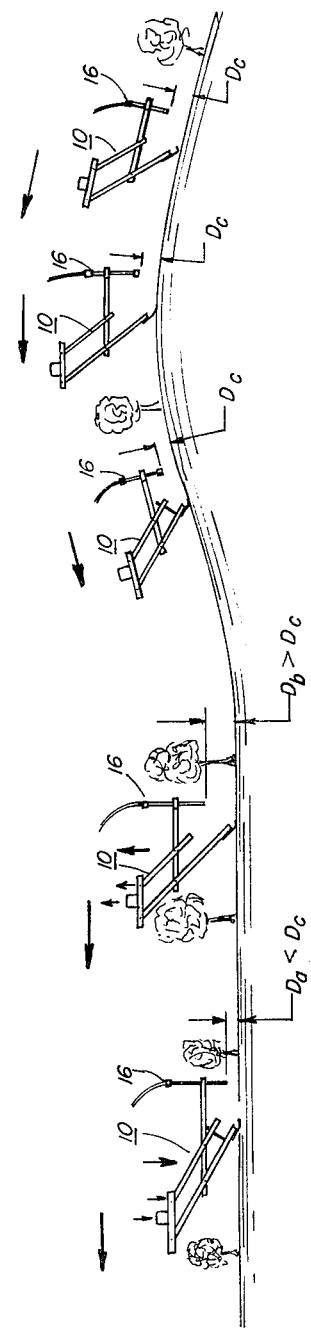
FIG. 4 is a side elevation of a non-level field showing the invention variously positioned therein.

Frame 10 comprises unequally long and rigid side elements 18, 20, 22 and 24 pivoted together as a parallelogram 26 with opposite sides between pivots that are equal are parallel, and with the unequal side elements 20-24 extending downwardly and rearwardly beyond pivots 30 and 32. Frame 10 is fixed to lift bar 12 by side element 18. Side element 20 engages the level and uneven surfaces of a field by a free-end 34 fixed to a sliding shoe 36. Side element 22 adjustably supports on a free-end 38 spray pipe and nozzle 16. And side element 24 adjustably mounts on its free-end 40 an adjustable stop 42 for engaging free-end 34 to limit pivoting of frame 10 when encountering abrupt depressions, such as a ditch, and preventing engaging spray pipe and nozzle with the surface thereof. A chain stop 44 limits pivoting, when lift bar 12 is raised excessively, for preventing spray pipe and nozzle 16 from engaging field surface. Referring to FIG. 3, a pivot 46 pivoting side elements 18 and 24 together engages in a forwardly and upwardly slanting slot 48 for increasing pivoting of the side elements for transportation purposes. In spraying, the operational forces restricts pivot 46 to the lower end of slot 48.

In use, with frame 10 fixed to lift bar 12 of the prime mover 14 spray pipe and nozzle 16 is adjusted in height above a field surface and in perpendicular attitude thereto to spray herbicide below the foilage level of the crop and over the tops of weeds growing therebelow. The pivoting side elements of parallelogram 26 compensates for any unevenness of field surfaces to maintain the set constant height above the field surface and a vertical attitude thereto of the spray nozzle. In going into any abrupt declivity, such as crossing a ditch, stop 42 limits the pivoting to prevent digging nozzle into field surface.

For use with crops of different heights, raising and lowering the prime movers lift bar 12 changes the height of spray pipe and nozzle 16 with no change in vertical attitude. The chain stop 44 comprises a chain 50 fixed to side element 20 that is led upward and through a hole 52 in side element 18 and back down to adjustably engage a link of the upward run of chain 50. Chain stop 44 limits pivoting in parallelogram 26 for excessive changes in height of lift bar 12 that might cause the spray nozzle to engage the field surface.

The number of frames 10 is limited only by the length of the cross lift bar of the prime mover and the width of the crop rows when spraying large areas.

What is claimed is:

1. A spray cultivator for spraying the tops of weeds growing under crops of varying heights on rolling fields, and said cultivator being attachable to a lift bar behind a prime mover for pulling said cultivator up and down crop rows, said cultivator comprising:
   (a) rigid side element means of unequal lengths pivoted together in an angularly flexible frame defining a parallelogram between pivots and with free ends extending downward and rearward, said frame being fixed normal to the cultivator lift bar by a frame side extending longitudinally of said prime mover, and with a forward element of said side element means pivotally depending to engage and follow with a free end the surface of said rolling field for pivoting the remaining side element means of said angularly flexible frame to remain respectively parallel to the respectively fixed and depending remaining side element means and with the free end of said remaining side element means opposite and parallel to said fixed side element means being kept at a constant height and attitude above said rolling field; and (b) spray pipe and nozzle means adjustably mounted on said free end of side element means opposite said longitudinally extending fixed side element means for spraying weeds at a constant attitude and height above a rolling field of changing levels.

2. A spray cultivator as described in claim 1 wherein said forward element of said side element means pivotally depending to engage and follow the rolling surface of said field with a free end comprises:

(a) a sliding shoe means fixed to said depending end for slidably engaging said rolling field surface continuously and without upset; and (b) chain means adjustably fixed in length to an opposite end of said depending end and said fixed side element means for limiting downward pivoting of said angularly flexible frame when said cultivator is lifted clear of said rolling field by said lift bar.

3. A spray cultivator as described in claim 1 wherein the rear remaining side element means of said angularly flexible frame opposite and parallel to said forward element of side element means comprises:

(a) rigid stop means adjustably mounted in a free end thereof and adapted to engage the free depending end of said forward element for limiting upward pivoting of said forward side element responsive to large abrupt changes in said rolling field levels.

4. A spray cultivator as described in claim 1 wherein said fixed side element means comprises:

(a) slot means defined therein and adjacent a rear end thereof and in which said rear remaining side element is slidably pivoted and adapted to slide upward and forward in said slot when the angularly flexible frame is raised to close more tightly in transport, and downward and to the rear for normal pivoting with said frame in operational position.

5. Method of spray cultivating crops of varying heights on rolling fields comprising the steps of:

(a) fixing normal to a prime mover lift bar an upper side a pivotally connected parallelogram frame having three unfixed lower sides with free ends extending downward and rearward beyond lower pivotal connections, said frame connected longitudinally with said prime mover;

(b) Engaging the surface of said rolling field with the free end of a forward unfixed lower side of said frame;

(c) supporting on the free end of a lower side parallel to said fixed upper side a spray pipe and nozzle adjustable to a height and attitude to spray under crop foliage and on the tops of weeds growing thereunder, said free ends of both said forward unfixed lower side and said lower side parallel to said fixed upper side of said parallelogram frame being pivotally responsive to changes in the level of said rolling field for said spray pipe and nozzle to remain at the height and attitude set in all changes in level of said field; and (d) changing height of lift bar for change in crop heights without changing spray pipe and nozzle attitude.

* * * * *